(12) United States Patent
Prichard et al.

(10) Patent No.: US 8,256,998 B2
(45) Date of Patent: Sep. 4, 2012

(54) METAL CUTTING SYSTEM FOR EFFECTIVE COOLANT DELIVERY

(75) Inventors: Paul D. Prichard, Greensburg, PA (US); Linn R. Andras, Ligonier, PA (US); Ted R. Massa, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 13/221,020

(22) Filed: Aug. 30, 2011

(65) Prior Publication Data

US 2011/0311325 A1 Dec. 22, 2011

Related U.S. Application Data

(62) Division of application No. 12/899,844, filed on Oct. 7, 2010, now Pat. No. 8,033,763, which is a division of application No. 11/654,918, filed on Jan. 18, 2007, now Pat. No. 7,883,299.

(51) Int. Cl.
*B23B 27/10* (2006.01)

(52) U.S. Cl. .................................. 407/11; 407/2; 407/6

(58) Field of Classification Search ................. 407/2, 6, 407/11, 115, 118, 119; *B23B 27/10; B23P 15/28*
See application file for complete search history.

(56) References Cited

U.S. PATENT DOCUMENTS

| | | | |
|---|---|---|---|
| 2,870,523 A | 1/1959 | Richard | |
| 3,077,802 A | 2/1963 | Philip | |
| 3,323,195 A | 6/1967 | Vanderjagt | |
| 3,429,700 A | 2/1969 | Wiegand et al. | |
| 3,486,378 A | 12/1969 | Carlson | |
| 3,571,877 A | 3/1971 | Zenkle | |
| 3,798,726 A | 3/1974 | Dudley | |
| 3,889,520 A | 6/1975 | Stoferle et al. | |
| 3,971,114 A | 7/1976 | Dudley | |
| 4,012,061 A | 3/1977 | Olson | |
| 4,123,194 A | 10/1978 | Cave | |
| 4,204,787 A | 5/1980 | McCray et al. | |
| 4,276,085 A | 6/1981 | Wisell | |
| 4,437,800 A | 3/1984 | Araki et al. | |
| 4,535,216 A | 8/1985 | Cassidenti | |
| 4,579,488 A | 4/1986 | Griffin | |
| 4,682,916 A | 7/1987 | Briese | |
| 4,813,831 A | 3/1989 | Reinauer | |

(Continued)

FOREIGN PATENT DOCUMENTS

DE 3004166 C2 2/1908

(Continued)

OTHER PUBLICATIONS

ASTM Tool Engineers Handbook, McGraw Hill Book Co., New York, New York (1949) pp. 302-315.

(Continued)

*Primary Examiner* — Boyer D Ashley
*Assistant Examiner* — Sara Addisu
(74) *Attorney, Agent, or Firm* — Larry R. Meenan, Esq.

(57) ABSTRACT

A metal cutting system with a tool holder, a shim, an insert with a top depression, a top piece and a clamp. A rake face cooling channel for fluid delivery is formed between the top piece and the depression in the insert. A primary discharge slot at the end of the rake face cooling channel delivers fluid from below the cutting edge of the insert. A second cooling channel for delivery of fluid to the flank face is formed between the insert and the shim or is formed between the shim and the tool holder with a portion of the cooling channel passing through the shim.

3 Claims, 9 Drawing Sheets

U.S. PATENT DOCUMENTS

| | | |
|---|---|---|
| 4,848,198 A | 7/1989 | Royal et al. |
| 4,861,203 A | 8/1989 | Bassett et al. |
| 4,880,461 A | 11/1989 | Lichida |
| 4,880,755 A | 11/1989 | Mehrotra |
| 4,881,431 A | 11/1989 | Bieneck |
| 4,955,264 A | 9/1990 | Ambrust |
| 5,024,976 A | 6/1991 | Mehrotra et al. |
| 5,148,728 A | 9/1992 | Mazurkiewicz |
| 5,163,790 A | 11/1992 | Vig |
| RE34,180 E | 2/1993 | Nemeth et al. |
| 5,222,843 A | 6/1993 | Katbi et al. |
| 5,237,894 A | 8/1993 | Lindeke |
| 5,252,119 A | 10/1993 | Nishida et al. |
| 5,265,985 A | 11/1993 | Boppana et al. |
| 5,275,633 A | 1/1994 | Johansson et al. |
| 5,288,186 A | 2/1994 | Kovacevic |
| 5,290,135 A | 3/1994 | Ball et al. |
| 5,316,323 A | 5/1994 | Jovanovic |
| 5,333,520 A | 8/1994 | Fischer et al. |
| 5,346,335 A | 9/1994 | Harpaz et al. |
| 5,388,487 A | 2/1995 | Danielsen |
| 5,439,327 A | 8/1995 | Wertheim |
| 5,516,242 A | 5/1996 | Andronica |
| 5,525,134 A | 6/1996 | Mehrotra |
| 5,542,792 A | 8/1996 | Krueger et al. |
| 5,554,338 A | 9/1996 | Sugihara et al. |
| 5,565,156 A | 10/1996 | Ingelstrom |
| 5,707,185 A | 1/1998 | Mizutani |
| 5,718,156 A | 2/1998 | Lagrolet et al. |
| 5,733,075 A | 3/1998 | Basteck |
| 5,761,974 A | 6/1998 | Wang et al. |
| 5,775,854 A | 7/1998 | Wertheim |
| 5,816,753 A | 10/1998 | Hall |
| 5,826,469 A | 10/1998 | Haradem |
| 5,829,331 A | 11/1998 | Mori |
| 5,901,623 A | 5/1999 | Hong |
| 5,955,186 A | 9/1999 | Grab |
| 5,975,817 A | 11/1999 | Komine |
| 6,010,283 A | 1/2000 | Heinrich et al. |
| 6,045,300 A | 4/2000 | Antoun |
| 6,050,756 A | 4/2000 | Buchholz et al. |
| 6,053,669 A | 4/2000 | Lageberg |
| 6,056,486 A | 5/2000 | Calvin |
| 6,117,533 A | 9/2000 | Inspektor |
| 6,124,040 A | 9/2000 | Kolaska et al. |
| 6,164,169 A | 12/2000 | Goff |
| 6,287,058 B1 | 9/2001 | Arai et al. |
| 6,287,682 B1 | 9/2001 | Grab et al. |
| 6,299,388 B1 | 10/2001 | Slabe |
| 6,312,199 B1 | 11/2001 | Sjoden et al. |
| 6,322,746 B1 | 11/2001 | LaSalle et al. |
| 6,350,510 B1 | 2/2002 | Konig et al. |
| 6,394,709 B1 | 5/2002 | Sjoo et al. |
| 6,443,672 B1 | 9/2002 | Lagerberg |
| 6,447,218 B1 | 9/2002 | Lagerberg |
| 6,447,890 B1 | 9/2002 | Leverenz et al. |
| 6,450,738 B1 | 9/2002 | Ripley |
| 6,471,448 B1 | 10/2002 | Lagerberg |
| 6,521,349 B1 | 2/2003 | Konig et al. |
| 6,528,171 B1 | 3/2003 | Endler et al. |
| 6,551,551 B1 | 4/2003 | Gegel et al. |
| 6,575,672 B1 | 6/2003 | Maier |
| 6,595,727 B2 | 7/2003 | Arvidsson |
| 6,634,835 B1 | 10/2003 | Smith |
| 6,637,984 B2 | 10/2003 | Murakawa et al. |
| 6,648,565 B2 | 11/2003 | Schweizer |
| 6,652,200 B2 | 11/2003 | Kraemer |
| 6,705,805 B2 | 3/2004 | Lagerberg |
| 6,708,590 B2 | 3/2004 | Lagerberg |
| 6,769,335 B2 | 8/2004 | Kaminski |
| 6,860,172 B2 | 3/2005 | Hecht |
| 6,884,499 B2 | 4/2005 | Penich et al. |
| 6,905,992 B2 | 6/2005 | Mehrotra |
| 6,913,428 B2 | 7/2005 | Kress et al. |
| 6,957,933 B2 | 10/2005 | Pachao-Morbitzer et al. |
| 6,998,173 B2 | 2/2006 | Liu et al. |
| 7,094,717 B2 | 8/2006 | Yeckley |
| 7,125,205 B2 | 10/2006 | Sheffler |
| 7,125,207 B2 | 10/2006 | Craig et al. |
| 7,160,062 B2 | 1/2007 | Tran |
| 7,252,024 B2 | 8/2007 | Zurecki et al. |
| 7,273,331 B2 | 9/2007 | Giannetti |
| 7,309,466 B2 | 12/2007 | Heinrich et al. |
| 7,396,191 B2 | 7/2008 | Fujimoto et al. |
| 7,407,348 B2 | 8/2008 | Sjogren et al. |
| 7,510,352 B2 | 3/2009 | Craig |
| 7,530,769 B2 | 5/2009 | Kress et al. |
| 7,621,700 B2 | 11/2009 | Jonsson et al. |
| 7,634,957 B2 | 12/2009 | Ghosh et al. |
| 7,641,422 B2 | 1/2010 | Berminge et al. |
| 7,687,156 B2 | 3/2010 | Fang et al. |
| 2001/0007215 A1 | 7/2001 | Murata et al. |
| 2002/0106250 A1 | 8/2002 | Murakawa et al. |
| 2003/0017014 A1 | 1/2003 | Morgulis et al. |
| 2003/0082018 A1 | 5/2003 | Kraemer |
| 2003/0095841 A1 | 5/2003 | Kraemer |
| 2004/0240949 A1 | 12/2004 | Pachao-Morbitzer et al. |
| 2005/0186039 A1 | 8/2005 | Muller et al. |
| 2006/0140728 A1 | 6/2006 | Giannetti |
| 2006/0171837 A1 | 8/2006 | Heinrich et al. |
| 2006/0263153 A1 | 11/2006 | Isaksson |
| 2008/0175676 A1 | 7/2008 | Prichard |
| 2008/0175677 A1 | 7/2008 | Prichard et al. |
| 2008/0175678 A1 | 7/2008 | Prichard |
| 2008/0175679 A1 | 7/2008 | Prichard |

FOREIGN PATENT DOCUMENTS

| | | |
|---|---|---|
| DE | 3429842 A1 | 2/1986 |
| DE | 3740814 A1 | 12/1987 |
| EP | 100376 A2 | 2/1984 |
| EP | 0599393 B1 | 2/1996 |
| EP | 0932460 B1 | 6/2003 |
| FR | 1279749 | 1/1961 |
| FR | 2244590 | 9/1973 |
| JP | 5669007 A2 | 6/1981 |
| JP | 60127904 A | 7/1985 |
| JP | 04183503 A2 | 6/1992 |
| JP | 05301104 | 11/1993 |
| JP | 06083205 U | 11/1994 |
| JP | 07227702 A2 | 8/1995 |
| JP | 07237006 | 9/1995 |
| JP | 08025111 A | 1/1996 |
| JP | 08039387 | 2/1996 |
| JP | 08039387 A | 2/1996 |
| JP | 09262706 A | 10/1997 |
| JP | 10094904 A2 | 4/1998 |
| JP | 2000280106 A | 10/2000 |
| JP | 2001113408 A | 4/2001 |
| JP | 2001239420 A | 9/2001 |
| JP | 2003053622 A | 2/2003 |
| JP | 2003266207 A2 | 9/2003 |
| JP | 2003266208 A2 | 9/2003 |
| JP | 2004122262 A | 4/2004 |
| JP | 2005279900 A2 | 10/2005 |
| JP | 06136953 A | 6/2006 |
| KR | 1020060027154 A | 3/2006 |
| KR | 1020060054916 A | 5/2006 |
| WO | 0076697 A2 | 12/2000 |
| WO | 0158632 A1 | 8/2001 |

OTHER PUBLICATIONS

Moltrecht, K.H., Machine Shop Practice, Industrial Press Inc., New York, New York (1981) pp. 199-204.

Santhanam et al., "Cemented Carbides", Metals Handbook, vol. 2, 10th edition, Properties and Selection, ASM international (1990) pp. 950-977.

Wertheim et al., "Influence of High-Pressure Flushing Through the Rake Face of a Cutting Tool", Annuals of the CIRP, vol. 41/1 (1992) pp. 101-106.

METAL CUTTING SYSTEM FOR EFFECTIVE COOLANT DELIVERY

CROSS-REFERENCE TO EARLIER PATENT APPLICATIONS

This patent application is a divisional patent application of co-pending U.S. patent application Ser. No. 12/899,844 filed Oct. 7, 2010 for a METAL CUTTING SYSTEM FOR EFFECTIVE COOLANT DELIVERY by Paul D. Prichard, Linn R. Andras and Ted Robert Massa, which is a divisional patent application of U.S. patent application Ser. No. 11/654,918 filed Jan. 18, 2007 for a METAL CUTTING SYSTEM FOR EFFECTIVE COOLANT DELIVERY by Paul D. Prichard, Linn R. Andras and Ted Robert Massa, now U.S. Pat. No. 7,883,299. Applicants hereby claim the benefit of the priority filing date of said above-referenced parent patent application (i.e., U.S. Ser. No. 11/654,918 filed Jan. 18, 2007, now U.S. Pat. No. 7,883,299), and applicants hereby claim the benefit of the priority date of the co-pending patent application U.S. Ser. No. 12/899,844 filed Oct. 7, 2010. Further, applicants hereby incorporate by reference herein the entirety of said parent patent application (i.e., U.S. Ser. No. 11/654,918 filed Jan. 18, 2007, now U.S. Pat. No. 7,883,299) and incorporate by reference herein the entirety of the divisional patent application (Ser. No. 12/899,844 filed Oct. 7, 2010).

FIELD OF THE INVENTION

The subject invention is directed to metal cutting system and, in particular, to a metal cutting system adapted to permit effective coolant delivery to an interface between a metal cutting tool and a workpiece.

BACKGROUND OF THE INVENTION

Metal cutting tools for performing metal working operations generally comprise a cutting insert having a surface terminating at a cutting edge and a tool holder formed with a seat adapted to receive the insert. The cutting insert engages a workpiece and removes a chip therefrom. Obviously, it is desirable to lengthen the life of a cutting insert in metal cutting operations. Longer insert life leads to lower operating costs and better machine efficiency. One factor in the life of a cutting insert is the temperature of the insert during cutting operations. A higher insert temperature will result in a shorter useful life of an insert.

Many systems have been designed to lower the insert temperature during cutting. For example, coolants may be generally applied through nozzles directed at the cutting edge of the insert. The coolant serves not only to lower the temperature of the insert but also to remove the chip from the cutting area. The nozzles are often a distance of 1-12 inches away from the cutting edge. This is too far of a distance for effective cooling. The farther the coolant must be sprayed the more the coolant will mix with air and the less likely it will be to actually contact the tool-chip interface. Some have improved cooling by directing high pressure and high volume coolant at the cutting edge as shown in U.S. Pat. No. 6,045,300 issued to Antoun. Others have designed grooves between the insert and a top plate that secures the insert in the holder to reduce the distance the coolant must be sprayed. This is shown in U.S. patent application Ser. No. 2003/0082011 8 to Kraemer. Some have delivered liquid nitrogen as the coolant relatively near the cutting edge of an insert as shown in U.S. Pat. No. 5,901,623 issued to Hong. Each variation has shown limited effectiveness. Many still are positioned to far from the tool-workpiece interface. Those with grooves between the top plate and the insert get fluid closer to the tool-workpiece interface but are not close enough. The design in Kraemer is also limited in that the direction of fluid flow is almost completely limited to one plane. The liquid nitrogen system like that in Hong has shown some benefit but is cost prohibitive for most applications. It is clear there remains a need for a simple and effective assembly for insert cooling during metal cutting operations.

BRIEF SUMMARY OF THE INVENTION

The inventor(s) have recognized the problems associated with conventional cooling apparatus and have developed an insert assembly that works with a conventional coolant system to deliver coolant to a cutting insert that addresses the problems of the prior art.

In one embodiment of the invention, the assembly comprises a tool holder having a recess to accept a cutting insert and a passage for coolant delivery; a shim having a cooling channel capable of delivering coolant to a flank face or cutting edge of an insert; a cutting insert having a frusto-conical depression in the center of the insert and an orifice aligned with the coolant passage of the tool holder; a top piece with a depression in a top surface and a frusto-conical bottom aligned with the frusto-conical depression of the cutting insert to form a fluid tight seal between the insert and top piece except for a rake face cooling channel spanning from the insert orifice to a discharge slot that is in close proximity to the cutting edge or corner of the insert; and a clamp capable of sealing the cooling channels and seating the cutting insert and top pieces. The oblique relationship between the top piece-insert interface and the plane of the rake face of the insert enables coolant to be delivered from an angle below the plane of the rake face. In this way the coolant impinges the underside of a chip. Delivery of coolant to the flank of the insert combined with the rake face cooling described herein has shown to be an efficient means of cooling the insert and removing the chip. As a consequence insert life is significantly improved by using this invention.

BRIEF DESCRIPTION OF THE DRAWINGS

Further features of the present invention, as well as the advantages derived therefrom, will become clear from the following detailed description made with reference to the drawings in which:

FIG. 9 is a view of the insert side of the top piece with a centering stud; and.

DETAILED DESCRIPTION OF THE INVENTION

Figure 1:
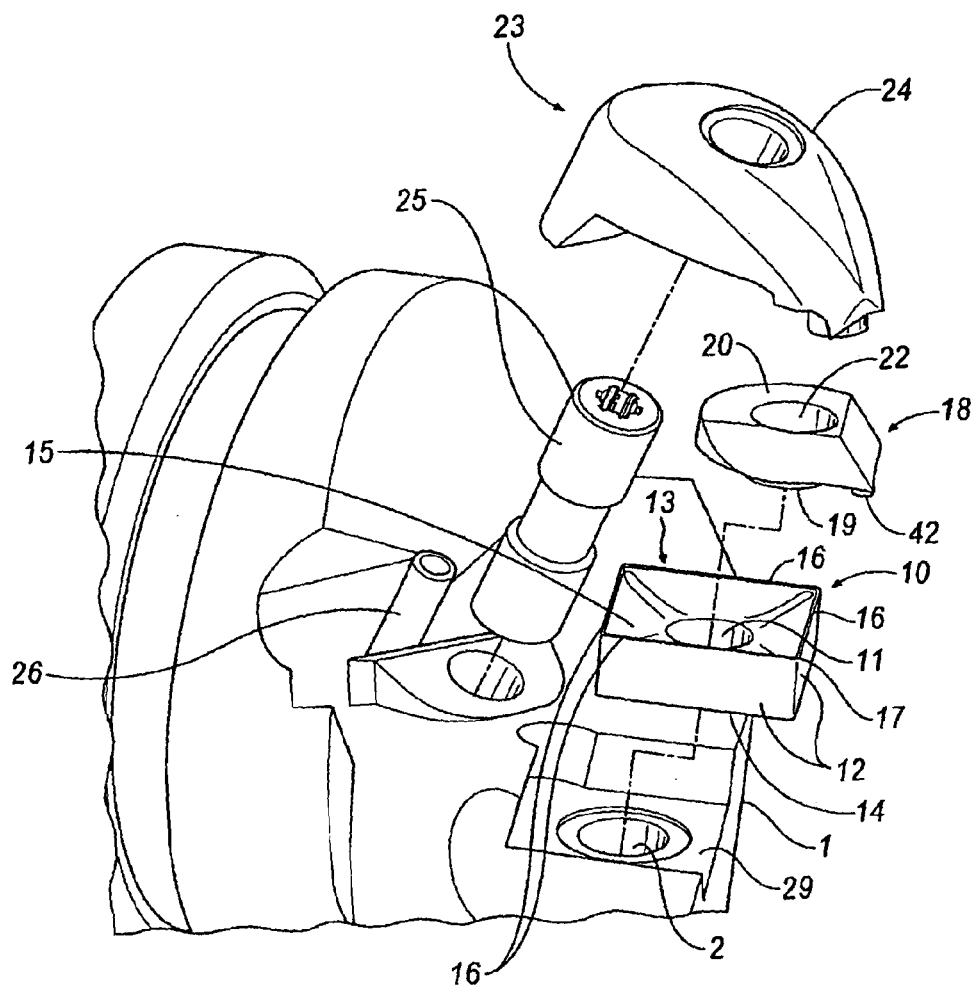
FIG. 1 is an exploded view of the invention with rake face cooling only.

Referring to FIG. 1 of the invention, there is shown a tool holder I having a recess 29 for receiving a cutting insert 10. The tool holder 1 also has a coolant passage 2 for delivering fluid coolant to the recess 29. An indexable, cutting insert 10 is positioned in the recess 29. The cutting insert 10 has at least one flank face 12, a rake face 13 and a bottom face 14. The intersection between the flank face 12 and the rake face 13 forms a cutting edge 16. In the instance of a plurality of flank faces, the intersection between two adjacent flank faces 12 and the rake face 13 forms a cutting corner 17. It will be appreciated that a round cutting insert does not include two adjacent flank faces and therefore does not include a cutting corner. Although a round cutting insert does not include a cutting corner it will be appreciated that in any case, a cutting edge is present. An insert depression 15 is located in the rake face 13 of the insert 10. The insert depression 15 is an area within the rake face 13 that is lower than the remaining portion of the rake face 13 surrounding the insert depression 15 and including the cutting edges 16 and as appropriate, cutting corner 17. In one embodiment, the cutting edges 16 and cutting corner all lie within the same plane. It will be apparent that some of the cutting edges may also lie above or below one another in elevation. For example, this would be the case if an elliptically shaped insert with an uneven rake face were used as the insert in the metal cutting system.

The insert 10 has an insert orifice 11 that aligns with the coolant passage 2 of the tool holder 1 to receive coolant. The insert orifice 11 opens to both the rake face 13 and the bottom face 14. A top piece 18 is adjacent to insert 10. The top piece 18 has a clamp side 20 and insert side 19. Insert side 19 of top piece 18 has a shape corresponding to the insert depression 15 such that positioning the two together forms a seal. The top piece also has a reservoir 34 (shown in FIG. 5) in the insert side 19. The reservoir 34 is a pocket in the insert side 19 of the top piece 18 that aligns with the insert orifice 11. The reservoir 34 distributes coolant to the top piece 18. Top piece 18 also has at least one rake face cooling channel 21. The rake face cooling channel 21 is a groove formed in the insert side 19 of the top piece 18 that runs from the reservoir 34 to the point on the top piece 18 nearest the cutting edge 16 or cutting corner 17, as appropriate. See FIG. 5 for a view of the rake face cooling channel 21. When the top piece 18 is seated in the insert depression 15 the rake face cooling channel 21 seals against the insert depression 15 to create a coolant path to cutting edge 16 or cutting corner 17. It is also contemplated that the rake face cooling channel 21 could be formed by a groove in the insert depression 15 which seals against the insert side 19 of the top piece 18. A clamp 23 applies pressure to the top piece depression 22. The clamp 23 maintains the alignment and seal between top piece 18, insert 10 and tool holder 1. It will be appreciated that the type of clamp 23 is not limited to the style shown in the drawings. Rather, the clamp 23 can include any other suitable clamp style of a type well known in the art.

Figure 7:
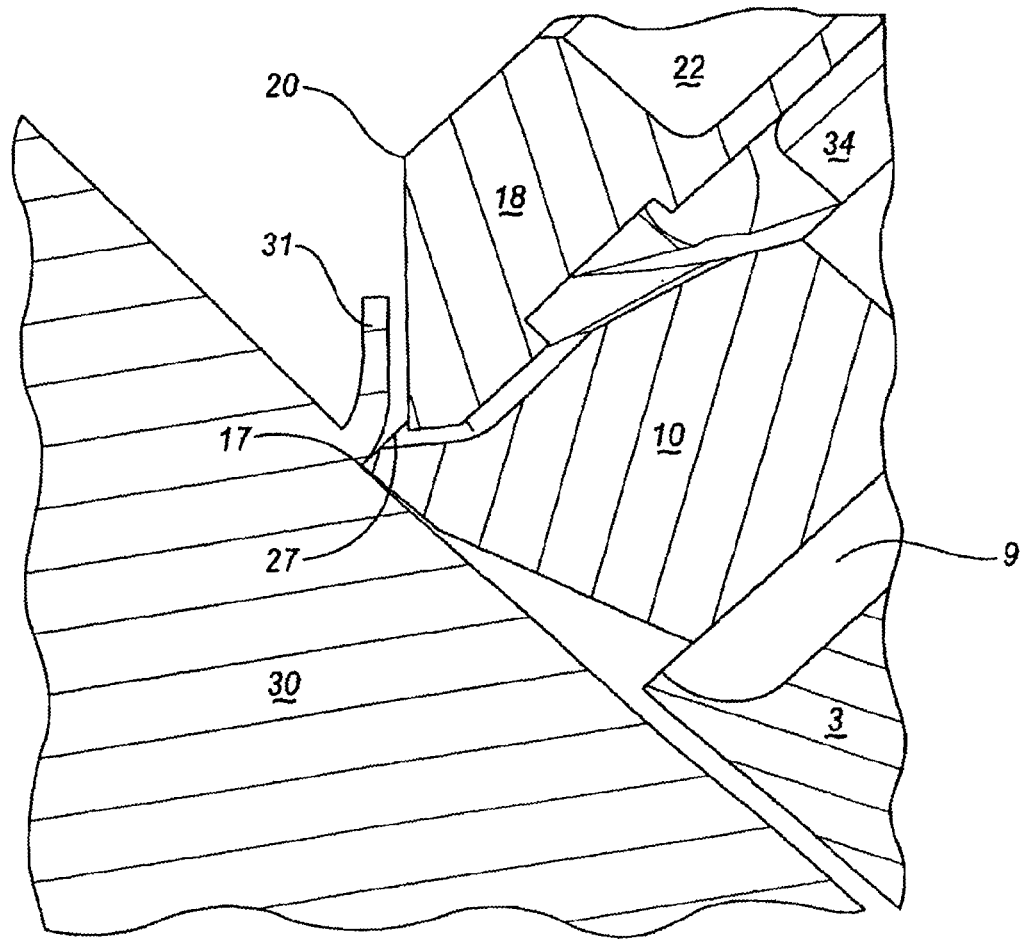
FIG. 7 is a cross-sectional perspective of the invention engaging a workpiece and forming a chip.

As shown in FIG. 7 when the insert 10 engages a workpiece 30 a chip 31 is lifted away from the workpiece at the cutting edge 16 or cutting corner 17. The congruent relationship between the top piece 18 and insert depression 15 creates a rake face coolant cooling channel 21 that directs coolant so that it is delivered from an angle below the intersection at the rake face 13 and the chip 31. This delivery angle causes the coolant to impinge the underside of the chip resulting in improved cooling and chip removal. The rake face cooling channel 21 spans from the reservoir 34 to a point nearest the cutting edge. A primary discharge slot 27 is formed at the end of the rake face cooling channel 21 nearest the cutting edge 16 or cutting corner 17. It is an important aspect of this invention that the primary discharge slot 27 lie below the cutting edge 16 or corner 17. In this description, "below the cutting edge" or "below the cutting corner" in this description means generally towards the recess 29 as opposed to "above the cutting edge" or "above the cutting corner" which would be generally towards the clamp. Cooling and chip removal are most efficient when the primary discharge slot 27 is within about 0.100 inches of the chip.

Figure 2:
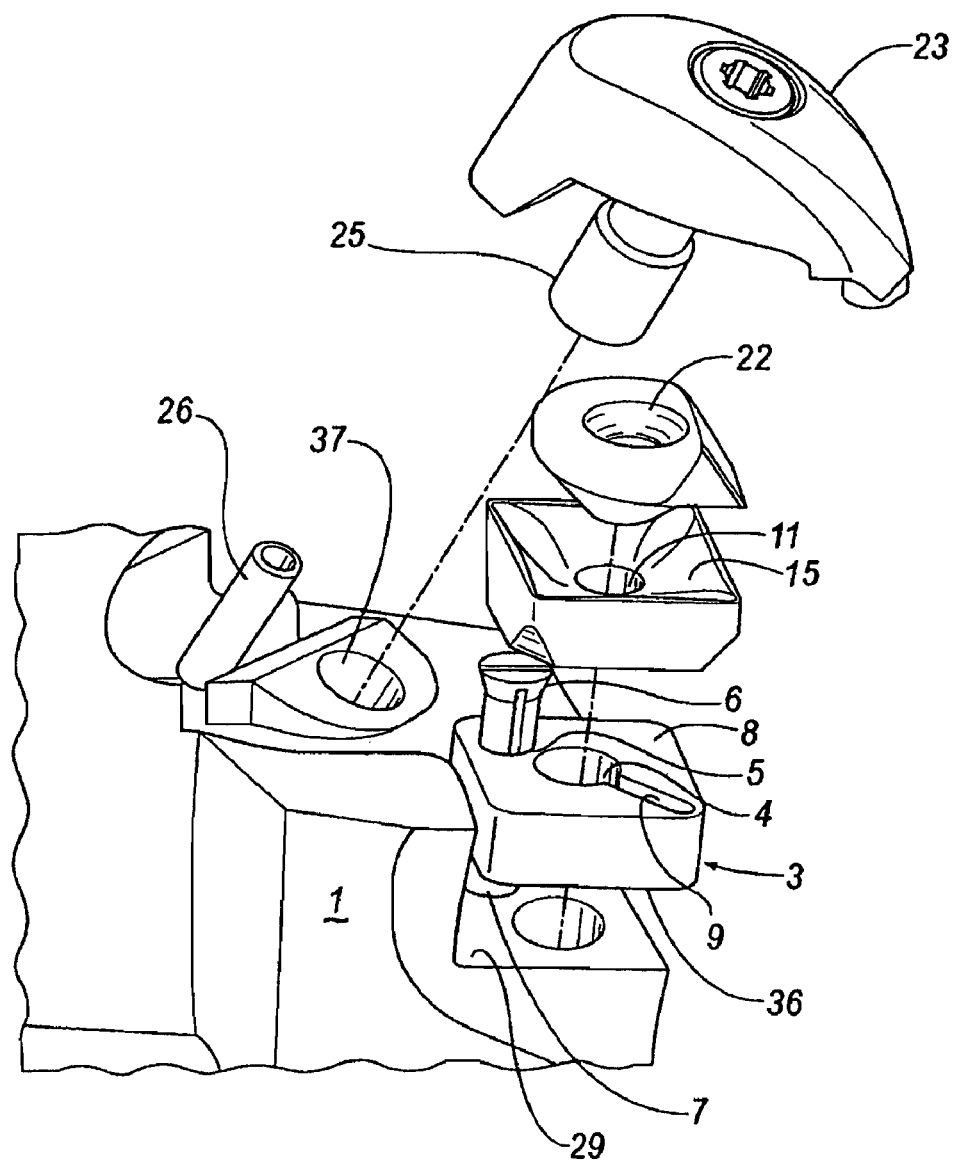
FIG. 2 is an exploded view of the invention with rake and flank cooling.
Figure 5:
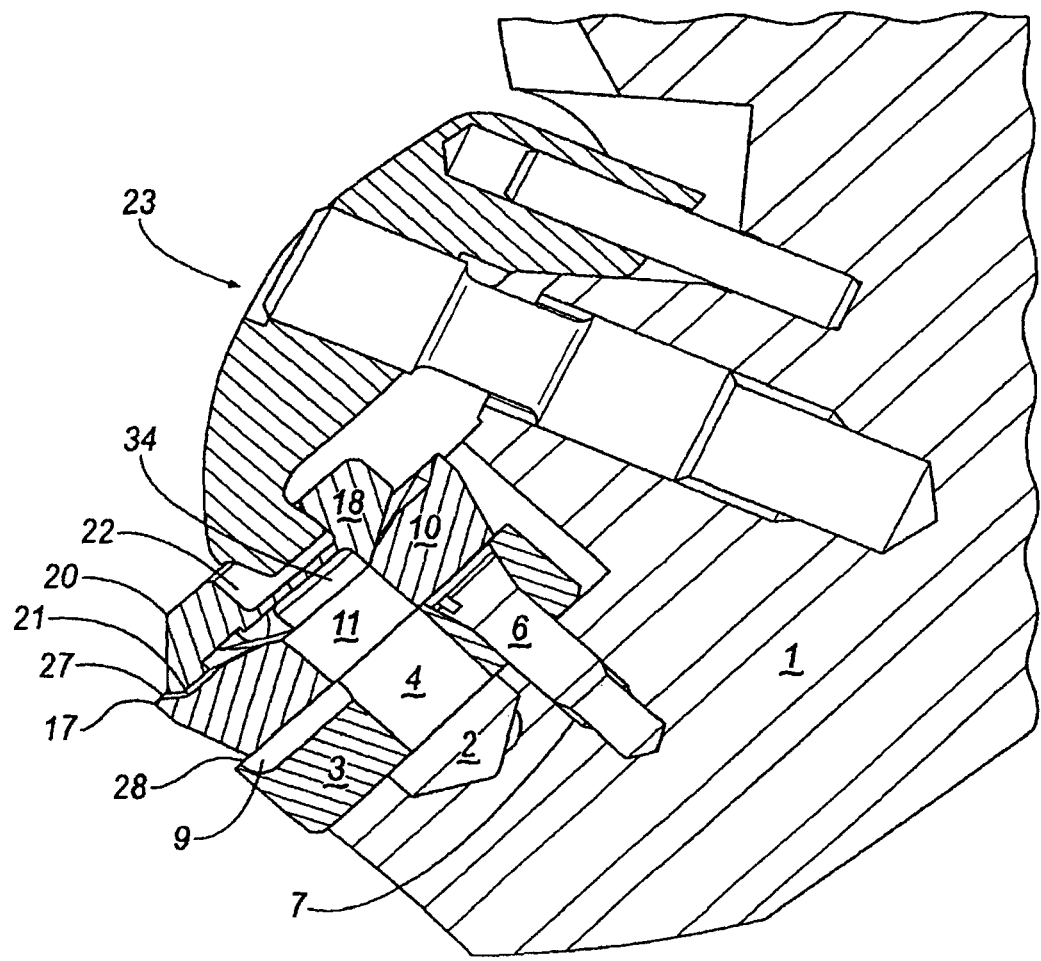
FIG. 5 is a cross section of a perspective view of the invention with rake and flank face cooling.

In another embodiment shown in FIG. 2 and FIG. 5, a shim 3 having a top side 8 and a bottom side 36 is positioned between the tool holder 1 and the insert 10. The shim 3 is oriented so that the bottom side 36 abuts the tool holder 1 and the top side abuts the insert 10. A shim pin 6 is inserted through a shim pin hole 5 and a tool holder pin hole 7. The shim pin 6 maintains the alignment of the shim 3 between the tool holder 1 and insert 10. A shim orifice 4 is formed through the center of the shim 3. The shim orifice 4 provides a path for coolant to pass from the coolant passage 2 of the tool holder 1 to the insert orifice 11. A slot forming a part of flank face cooling channel 9 is provided on the top side 8 of the shim 3. The insert bottom face 14 seals the exposed slot in the top side 8 of shim 3 to create a flank face cooling channel 9. The flank face cooling channel 9 spans from the shim orifice 4 almost to an outer portion of the shim 3 nearest the cutting edge 16 or cutting corner 17. The end of flank face cooling channel 9 nearest the cutting edge has a curved base so that coolant is directed toward the cutting edge 16 or cutting corner 17 or flank face 12 of the insert 10.

In the embodiment as shown, the insert 10 has flank faces 12 and flank edges 32 that taper inward at a shallow angle from the rake face 13 to the bottom face 14. In this manner the width of shim 3 will be less than the width of the insert bottom face 14 and less than the width of the rake face 13. Attention is drawn to the fact that this taper is meant to expose the flank faces 12 and flank edge 16 to coolant. The tapering of the insert 10 allows a portion of the flank face cooling channel 9 to be exposed creating secondary discharge hole 28, thus enabling expulsion of coolant along the flank faces of the insert 10.

Figure 3:
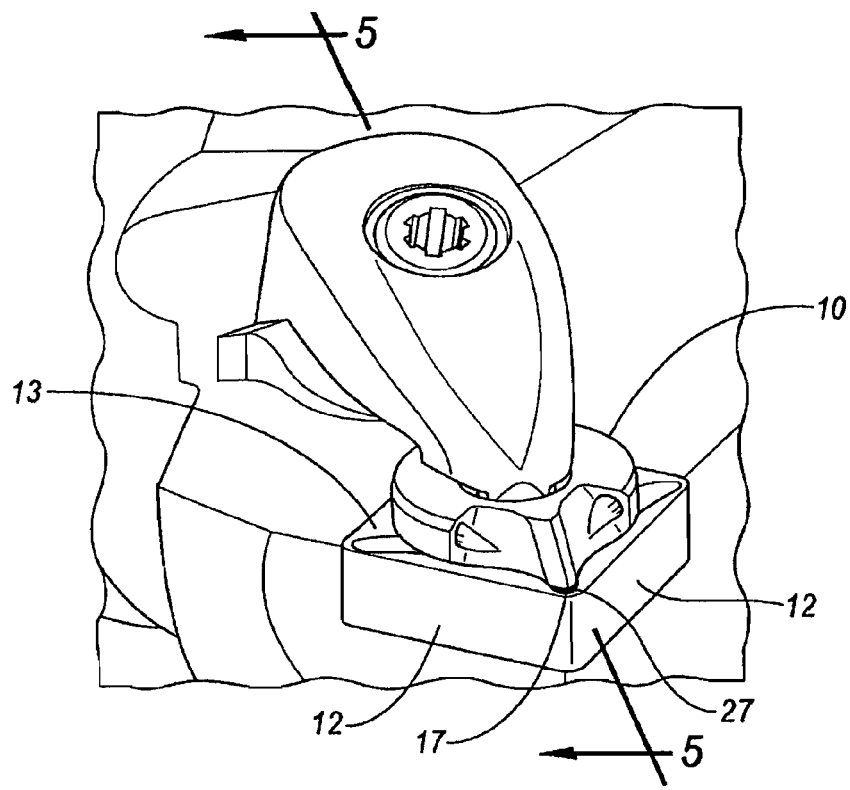
FIG. 3 is a perspective view of the invention with rake face cooling and jets.

A third embodiment shown in FIG. 3 adds jets 33 to the top piece 18. The jets 33 are additional coolant conduits to increase coolant flow rate and effectively direct more fluid to the tool-chip interface. The jets 33 run from the reservoir 34 to a discharge point on the clamp side 20 of the top piece 18 where the coolant can be directed at the tool-chip interface.

Figure 4:
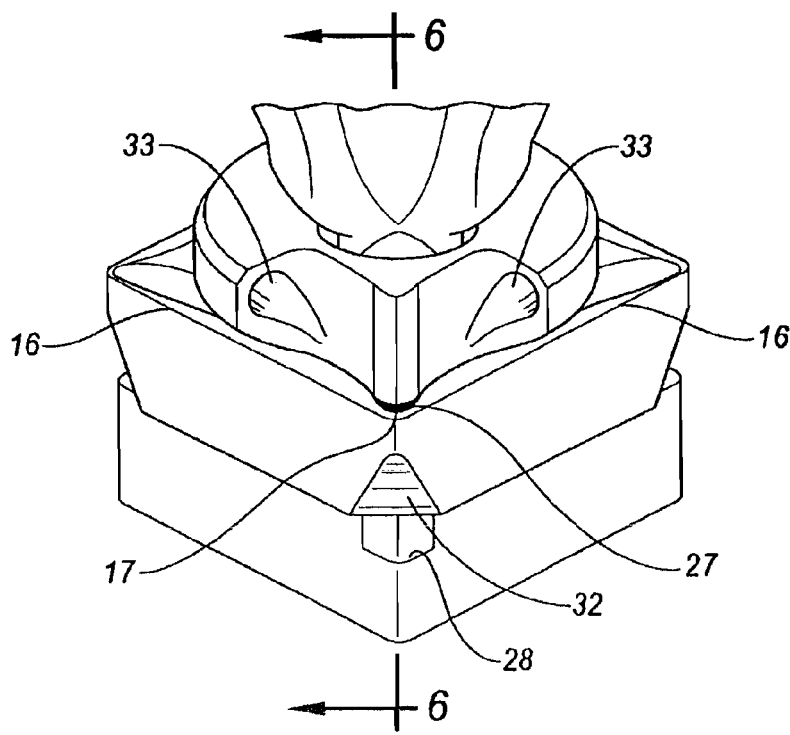
FIG. 4 is a perspective view of the preferred embodiment of the invention with high volume flank cooling, rake face cooling and jets.
Figure 6:
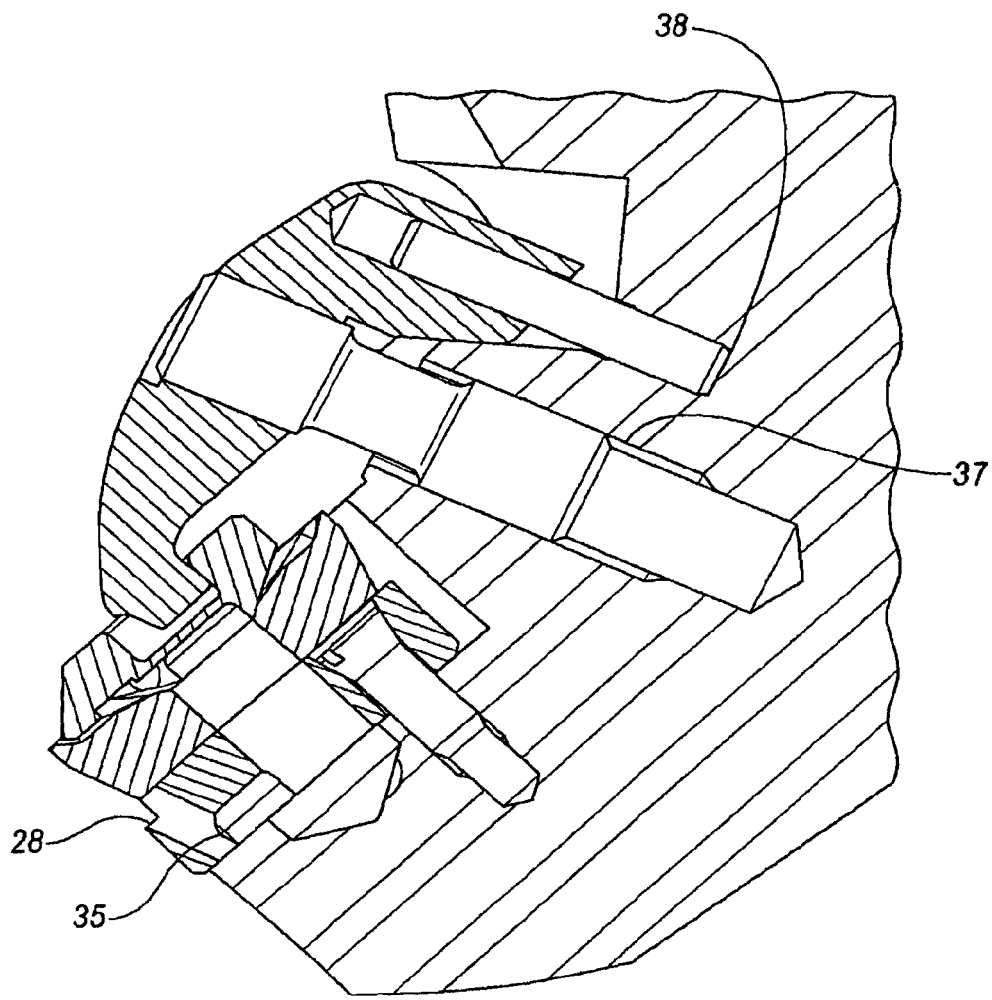
FIG. 6 is a cross section of a perspective view of the invention with rake and high volume flank face cooling.

An alternate embodiment of the invention is shown in FIG. 4 and FIG. 6. In this embodiment, the highest coolant flow rate is achieved providing flank and rake cooling. In this assembly, a shim 3 sits in the recess 29 of tool holder 1 having a tool holder pin hole 7. The shim 3 has a shim orifice 4 and a shim pin hole 5. The shim pin 6 is threaded and extends thorough the shim pin hole 5 in to the tool holder pin hole 7 which is also threaded. This arrangement keeps the shim 3 aligned in relation to the recess 29. A high volume flank cooling channel 35 is formed between the tool holder 1 and shim 3. Part of the high volume flank cooling channel 35 is formed by a groove in the bottom side 36 of the shim 3. This groove could also be formed in the recess 29 of the tool holder 1. The groove is closed by the recess 29 of the tool holder 1 creating a passage for coolant delivery. The high volume flank cooling channel 35 extends partway along the interface between the tool holder 1 and the shim 3 starting at the shim orifice 4 then projects through the body of the shim 3 toward the flank face 12 or flank edge 32 of the insert 10 ending with a secondary discharge hole 28 at a corner of the shim 3 closest to the cutting edge 16 or cutting corner 17 of the insert 10.

The insert 10 has tapered flank faces 12 and flank edges 32 to allow for adequate coolant wash from the secondary discharge hole 28. An insert orifice 11 aligns with the shim orifice 4. The insert bottom face 14 seats against the shim 3 to create a fluid tight seal. The insert depression 15 is frusto-conical and mates to the insert side 19 of the top piece 18 to create a fluid tight seal. The insert side 19 of the top piece 18 is also frusto-conical. The reservoir is located in the central portion of the insert side 19 and is in alignment with the insert orifice 11. The alignment of the reservoir 11, insert orifice 11, shim orifice 4 and coolant passage 2 creates a chamber from which coolant can freely flow to the high volume flank coolant channel 35, rake face cooling channel 21 and jets 33. In a preferred embodiment, the rake face cooling channel 21 runs from the reservoir 34 to within about 0.100 inches of the cutting edge 16 or cutting corner 17. At the end of the rake face cooling channel 21 opposite the reservoir 34 there is a nib 42 on the insert side 19 of the top piece 18. The nib 42 is a bump protruding from the insert side that interferes with the stream of coolant as it exits the primary discharge slot 27. A view of the nib 42 is most clearly shown in FIG. 9. The nib 42 causes the coolant to spray in a wide pattern from the primary discharge slot 27 as opposed to a less desirable concentrated stream that occurs without the nib 42. The rake face cooling channel is sized to be large enough to maximize flow without permitting entry of chips into the channel. Two jets 33 run from the reservoir 34 to exit points on the clamp side 20 that direct the coolant towards the cutting edge 16 or cutting corner 17. A top piece depression 22 is present on the clamp side 20. The clamp 23 has a clamp head 24 that engages the top piece depression 22 to seat the insert 10 and maintain fluid tight seals of all the coolant ducts. In a preferred embodiment, a clamp screw 25 applies pressure to the clamp head 24 in the direction of the top piece 18. A clamp pin 26 maintains alignment of the clamp head 24. It will be appreciated that although a specific clamping assembly is shown in the FIGS. 1-6 and 8, any suitable clamping assembly capable of holding the top piece, insert 10 and shim 3 securely in the recess 29 will suffice. Many of these clamping assemblies are commercially available and well known in the art.

Figure 8:
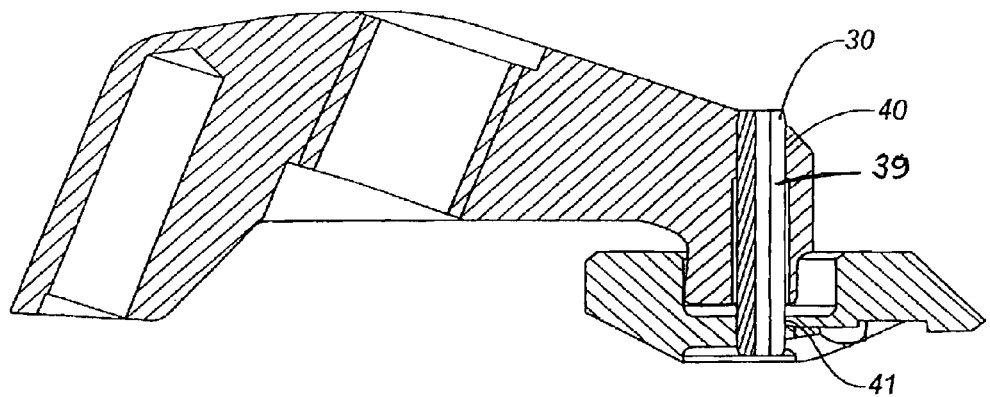
FIG. 8 is a cross section of a perspective view of the clamp and top piece fixed together with a slotted spring pin.

In the preferred embodiment, the total flow of all coolant passages should not be less than 80% of the possible flow from an unrestricted flood nozzle. It will be appreciated that some handling benefits have been seen when the top piece 18 is fixed to the clamp 23. This arrangement reduces the chance that an operator will inadvertently drop the top piece when removing or installing the assembly. The most effective means of fixing the top piece 18 to the clamp 23 is with a slotted spring pin 39. The slotted spring pin 39 is inserted into a clamp bore 40 and a top piece bore 41 which are aligned as seen in FIG. 8. Although other means of fastening the pieces together are possible, the use of a slotted spring pin 39 allows for some rotation of the top piece 18 about the main axis of the slotted spring pin 39. This arrangement allows the top piece 18 to be aligned with the differing orientations of the insert 10.

Figure 9:
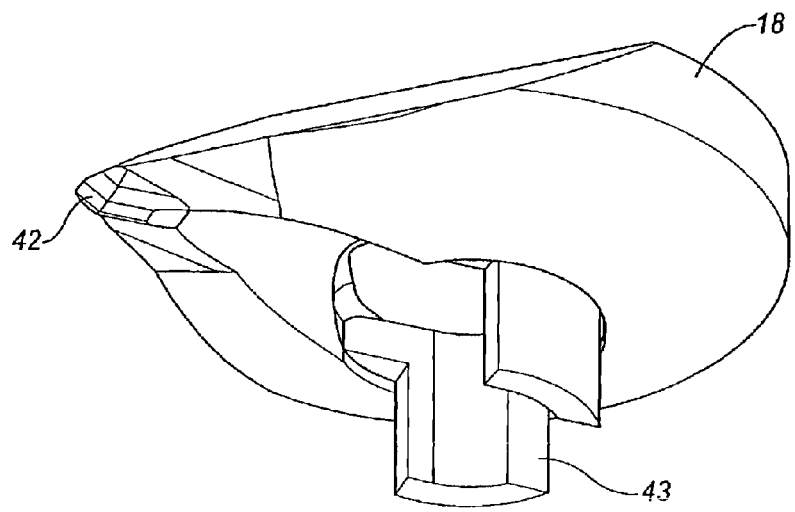
Figure 10:
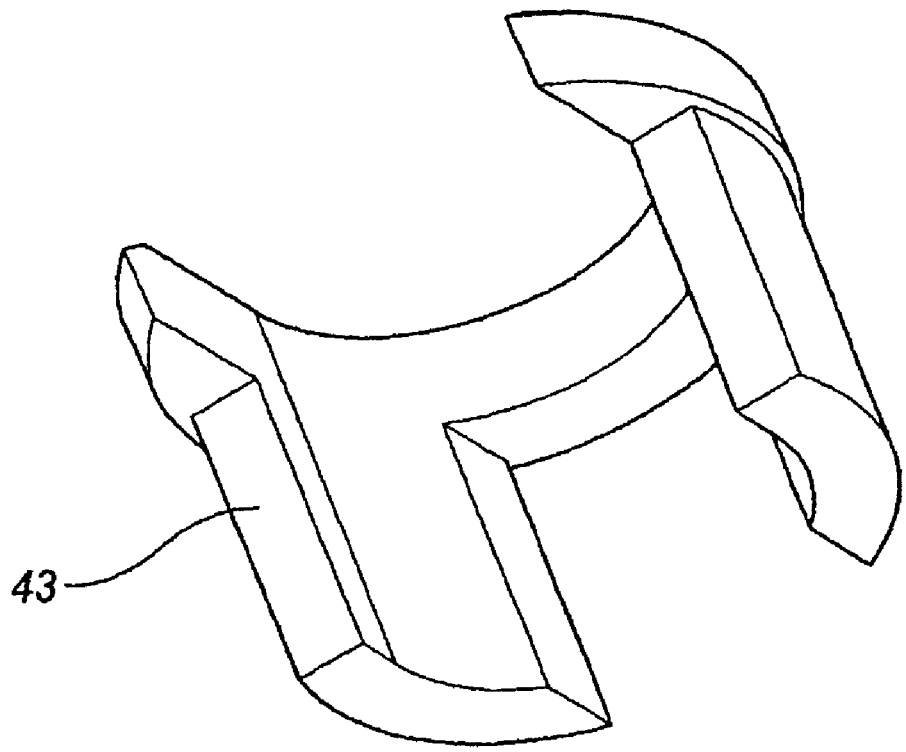
FIG. 10 is a perspective view of the centering stud.
Figure 11:
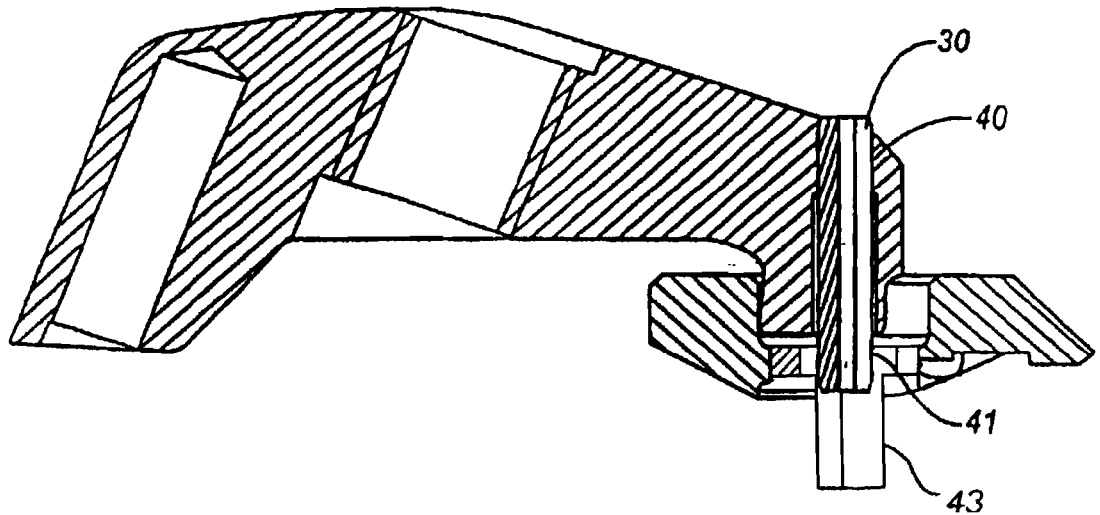
FIG. 11 is a cross section of a perspective of the clamp and top piece fixed together with a slotted spring pin and showing a reservoir within the insert side of the top piece and a centering stud seated in the reservoir.

A centering stud 43 can be included between the top piece 18 and insert 10. The centering stud 43 seats into the reservoir 34 and extends into the insert orifice 11. The shape of the centering stud conforms to the boundaries of the reservoir 34 and the insert orifice 11 and in this way the centering stud 43 acts as an alignment device. The centering stud has an open interior so that coolant flow is not restricted. FIG. 9 shows a centering stud fixed in the reservoir 34 of the top piece 18 and FIG. 10 is an isolated view of a centering stud. For illustrative purposes, the insert 10 is not shown in FIG. 9.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

The invention claimed is:

1. A metal cutting system comprising:
   a tool holder having a recess and a coolant passage for delivery of fluids,
   a shim comprising a bottom side abutting the tool holder in the recess, a top side opposite the bottom side and a shim orifice aligned with the coolant passage and spanning from the bottom side to the top side,
   an insert having a rake face having an insert depression lower than the remainder of the rake face, at least one cutting edge, an insert bottom face, at least one flank face being chamfered, at least one flank edge being chamfered in the same direction as the flank face, and an insert orifice spanning from the insert bottom face to the rake face, the insert bottom face being superposed on top side of the shim,
   a flank face cooling channel initially formed between the shim and the tool holder and partially running through the shim, whereby the flank face cooling channel terminates with a secondary discharge hole directed at the cutting edge or flank face and wherein the flank face cooling channel is in communication with the coolant passage of the tool holder to deliver fluid to the flank face;
   a top piece including a clamp side and an insert side congruently shaped to fit in the insert depression and cooperatively forming a cooling channel between the top piece and insert depression for delivery of fluid to a cutting corner or a cutting edge, wherein the cooling channel is in communication with the coolant passage and a primary discharge slot to deliver fluid to the cutting edge or cutting corner, wherein the primary discharge slot is located below the cutting edge;
   a reservoir within the insert side of the top piece and a centering stud positioned between the reservoir and the insert orifice to align the reservoir and insert orifice, the centering stud being generally cylindrical yet open through its center and open to the rake face cooling channel and jets contained in the top piece; and
   a clamp to hold the top piece, the insert and the shim securely in the tool holder.

2. A metal cutting system according to claim 1, wherein the insert is indexable.

3. The metal cutting system according to claim 1, wherein the top piece is fixed to the clamp.

* * * * *

UNITED STATES PATENT AND TRADEMARK OFFICE
CERTIFICATE OF CORRECTION

| | |
|---|---|
| PATENT NO. | : 8,256,998 B2 |
| APPLICATION NO. | : 13/221020 |
| DATED | : September 9, 2012 |
| INVENTOR(S) | : Paul D. Prichard et al. |

It is certified that error appears in the above-identified patent and that said Letters Patent is hereby corrected as shown below:

In Column 3, Line 9, delete "I" and insert -- 1 --, therefor.

Signed and Sealed this
Ninth Day of April, 2013

Teresa Stanek Rea
*Acting Director of the United States Patent and Trademark Office*